(12) United States Patent
Blocher et al.

(10) Patent No.: US 9,523,449 B2
(45) Date of Patent: Dec. 20, 2016

(54) PIPE COUPLING

(75) Inventors: Troy E. Blocher, Warsaw, IN (US); John M. Grooms, Rochester, IN (US)

(73) Assignee: Airvac, Inc., Rochester, IN (US)

( * ) Notice: Subject to any disclaimer, the term of this patent is extended or adjusted under 35 U.S.C. 154(b) by 837 days.

(21) Appl. No.: 13/426,057

(22) Filed: Mar. 21, 2012

(65) Prior Publication Data

US 2012/0242083 A1 Sep. 27, 2012

Related U.S. Application Data (60) Provisional application No. 61/466,277, filed on Mar. 22, 2011.

(51) Int. Cl.
*F16L 21/06* (2006.01)
*F16L 21/00* (2006.01)

(52) U.S. Cl.
CPC .............. *F16L 21/06* (2013.01); *F16L 21/005* (2013.01)

(58) Field of Classification Search
CPC ................................ F16L 21/06; F16L 21/005
USPC .......... 285/420, 419, 373, 337, 913; 16/254, 16/260, 267, 268, 269
See application file for complete search history.

(56) References Cited

U.S. PATENT DOCUMENTS

| | | | |
|---|---|---|---|
| 144,997 A | 11/1873 | Mayall | |
| 411,967 A | 10/1889 | Rieseck | |
| 494,996 A * | 4/1893 | Dwelle | ........................ 285/419 |
| 576,119 A | 2/1897 | Hess | |
| 577,774 A | 2/1897 | Munson | |
| 735,989 A | 8/1903 | Lippincott | |
| 1,966,039 A * | 7/1934 | Muchnic | .................... 285/135.5 |
| 2,020,156 A * | 11/1935 | Muchnic | .................... 285/135.5 |
| 2,417,741 A * | 3/1947 | Dillon | ........................... 285/373 |
| 3,432,190 A | 3/1969 | Kunz | |
| 3,705,737 A | 12/1972 | Westerlund et al. | |
| 3,828,403 A | 8/1974 | Perrin et al. | |
| 4,163,457 A | 8/1979 | Rickel et al. | |
| 4,273,364 A * | 6/1981 | de Lange | ................ F16L 41/12 285/197 |
| 4,373,235 A * | 2/1983 | Korgaonkar | ............ F16L 23/04 24/282 |
| 4,442,154 A | 4/1984 | Fortsch et al. | |
| 4,442,155 A | 4/1984 | Foertsch et al. | |
| 4,443,031 A | 4/1984 | Borsh et al. | |
| 4,541,145 A | 9/1985 | Sato et al. | |
| 4,561,678 A * | 12/1985 | Kunsman | ........................ 285/39 |
| 4,875,647 A | 10/1989 | Takagi et al. | |
| 4,915,418 A | 4/1990 | Palatchy | |
| 4,940,261 A * | 7/1990 | Somers Vine | ................ 285/112 |
| 5,018,768 A | 5/1991 | Palatchy | |
| 5,127,132 A * | 7/1992 | Karlin | ................... E05D 7/1044 16/261 |

(Continued)

*Primary Examiner* — David E Sosnowski
*Assistant Examiner* — James Linford
(74) *Attorney, Agent, or Firm* — Barnes & Thornburg LLP (57) ABSTRACT

A pipe coupling that clamps onto an area adjacent the ends of abutting pipes. The pipe coupling includes first and second clamp members, and a fastener. The first clamp member is hinged to the second clamp member. Both the first and second clamp members are configured to pivotally wrap around a pipe. Each of the first and second clamp members also includes an arched hub portion configured such that when each of the clamp members engages each other the arched hub portions form an arcuate hub. The fastener is configured to couple the arched hub portions together thereby preventing the clamp members from opening.

30 Claims, 12 Drawing Sheets

(56) References Cited

U.S. PATENT DOCUMENTS

| | | |
|---|---|---|
| 5,131,698 A | 7/1992 | Calmettes et al. |
| 5,188,400 A | 2/1993 | Riley et al. |
| 5,455,987 A * | 10/1995 | Svehaug .................... 16/267 |
| 5,655,265 A | 8/1997 | Schneider et al. |
| 5,855,044 A | 1/1999 | Cradduck |
| 5,864,926 A | 2/1999 | Gyongyosi et al. |
| 5,909,852 A | 6/1999 | Allert |
| 5,946,988 A | 9/1999 | Metz-Stavenhagen |
| 6,128,975 A | 10/2000 | Schley et al. |
| 6,389,930 B1 | 5/2002 | Gore |
| 6,554,233 B1 | 4/2003 | Ungerecht |
| 6,584,654 B1 | 7/2003 | Schaub |
| 6,594,869 B1 | 7/2003 | Chen |
| 7,093,326 B2 | 8/2006 | Oetiker |
| 7,364,205 B2 | 4/2008 | Weinhold |
| 7,578,486 B1 | 8/2009 | Taylor |
| 7,761,962 B2 | 7/2010 | Krauss et al. |
| 2005/0184523 A1* | 8/2005 | Stravitz .................... 285/903 |

\* cited by examiner

PIPE COUPLING

RELATED APPLICATIONS

The present application is related to and claims priority to U.S. Provisional Patent Application Ser. No. 61/466,277, filed on Mar. 22, 2011, entitled "Pipe Clamp." The subject matter disclosed in that provisional application is hereby expressly incorporated into the present application.

TECHNICAL FIELD

The present disclosure relates to pipe couplings. More particularly, the present disclosure relates to a modularly-formed coupling configured to clamp onto a rubber gasket that fits around a fluid pipe.

Conventional no-hub pipe clamps include a shield and rubber gasket that fit over either a damaged portion of pipe or two ends of a pipe for holding them together. A conventional no-hub coupling also includes hose clamps that wrap around the shield and gasket tightening and holding them onto the pipe. These conventional couplings, however, may have disadvantages in certain applications. For example, vacuum sewerage systems may be subject to water hammer effects. This is a sudden change in fluid momentum which results in a pressure surge. It has the practical effect of creating significant stress on pipes and, in the particular case of adjoining pipes, may produce enough pressure to separate them. The no-hub couplings may not be strong enough to keep the pipes together under this type of load.

In addition, while working in such sewer environments, installer's safety is always of concern. These shields are typically made from a thin band of stainless steel and have sharp edges. There is a risk the installer may be cut by one of these shields. Even if the injury itself is not significant, an open wound in a sewage environment is obviously problematic. The thin shield may also become damaged from installation and difficult to reuse.

To address these issues either collectively, alternatively or to address other issues, the present disclosure provides an alternative pipe coupling. One embodiment of the pipe coupling includes a first clamping member hinged to a second clamping member, both of which pivotally wrap around a gasket that fits over the two ends of adjoining pipes. With the two halves of the coupling joined, a curved hub is formed secured and together by a hose clamp, strap or other fastening device.

In an illustrative embodiment, the first and second clamp members can be made of a flexible plastic, reinforced resin, metal or other like functional material. Illustratively each clamp member may be identical to simplify manufacture and assembly. In an illustrative embodiment, each clamp member includes ribs that assist in applying a concentrated force against the gasket. In another illustrative embodiment, these ribs may be formed in pairs and those pairs may run divergently and transversely to the longitudinal extent of the adjoining pipes. The ribs may overlap to assist preventing the gasket from bunching.

Each clamp half may also include a hinge portion engageable with the hinge portion of the other half so when the two clamp halves are connected they are hingedly pivotable with respect to each other to make wrapping around the gasket a relatively easy task. In addition, an illustrative embodiment of the hinge includes a hook and pin design to make assembly easy and also to provide sufficient strength under high load conditions such as a water hammer. In another illustrative embodiment, opposite the hinge is an arched hub portion, teeth extend from each arched hub portion so when the clamp halves are engaged so too are the arched hub portions. The arched hub portions assist in preventing the gasket from bunching and also assist in properly aligning the clamp halves when they are joined together.

Another illustrative embodiment provides a pipe coupling that clamps onto an area adjacent the ends of abutting pipes. The pipe coupling includes first and second clamp members, and a fastener. The first clamp member is hinged to the second clamp member. Both the first and second clamp members are configured to pivotally wrap around a pipe. Each of the first and second clamp members also includes an arched hub portion configured such that when each of the clamp members engages each other the arched hub portions form an arcuate hub. The fastener is configured to couple the arched hub portions together thereby preventing the clamp members from opening.

In the above and other illustrative embodiments, the pipe coupling may further comprise: a gasket configured to fit adjacent the abutting ends of the pipes; the fastener being a hose clamp; the first and second clamp members being made of a material selected from a group consisting of flexible plastic, reinforced resin, and metal; the first and second clamp members being identical to each other; each of the first and second clamp members including at least one rib extending from an interior surface of each of the first and second clamp members; the rib being configured to apply a force against the gasket; each of the first and second clamp members including a plurality of ribs extending from an interior surface of each of the first and second clamp members; each of the plurality of ribs on the first clamp member being non-parallel with each other; each of the plurality of ribs on the second clamp member being non-parallel with each other; each of the first and second clamp members includes first and second hinge portions configured such that the first hinge portion of the first clamp member being engageable with the second hinge portion of the second clamp member, and wherein the second hinge portion of the first clamp member being engageable with the first hinge portion of the second clamp member; the first hinge portion includes a hook and the second hinge member includes a pin wherein the hook is configured to receive the pin such that engagement of the hook and pin from the first and second clamp members allow the first and second clamp members to pivot with respect to each other; wherein the first and second hinge members on the first clamp member is located opposite the first arched hub portion, and wherein the first and second hinge members on the second clamp member is located opposite the second arched hub portion; each of the first and second arched hub portions includes at least one tooth extending therefrom; ribs on the first and second clamp members are configured to engage the area adjacent ends of first and second abutting pipes; the first and second clamp members are configured to face each other such that hinge portions on each of the first and second clamp members engage each other to form a hinge and wherein first and second alignment teeth on each of the first and second clamp members, respectively, are configured to engage each other so the first and second arched hub portions form the arched hub; each of the first and second clamp members are curved and configured to collectively to fit around a pipe, and wherein each of the first and second clamp members include the hinge portion being located opposite its arched hub portion; each hinge portion includes a plurality of hinge fingers; each of the plurality of hinge fingers includes a pin and hook, wherein the pin extends from a first side of the hinge finger and the hook is located on a second side of the hinge finger opposite the first side; the pin being configured to be received by the hook; each of the first and second arched hub portions further comprises an alignment tooth, wherein the alignment tooth of the first arched hub portion is configured to engage the alignment tooth of the second arched hub portion when opposing the first arched hub portion; the plurality of ribs extend from the arched hub portion to the hinge portion; the first clamp member includes first and second hinge fingers, wherein each of the first and second hinge fingers includes a pin and hook, wherein the pin extends from a first side of the first hinge finger and the hook is located on a second side of the hinge finger opposite the first side; the pin being configured to be received by the hook; each of the first and second clamp members includes a plurality of ribs extending from an interior surface of each of the first and second clamp members, respectively, wherein a portion of the plurality of ribs of the first clamp member overlap a portion of the plurality of ribs of the second clamp member; and the first clamp member includes a plurality of radii wherein each radius is different; the pipe clamp does not employ a hinge pin that extends through each of the plurality of hinge fingers; each of the plurality of fingers on the first clamp member includes a hook, and wherein each of the plurality of fingers on the second clamp member includes a pin the hook and pin are configured to engage each other and movably couple to each other; the second clamp member includes a plurality of radii wherein each radius is different; each of the plurality of fingers including a wall having first and second surfaces wherein a hook is attached to the first surface of each wall; and each of the plurality of fingers includes a pin extending from the second surface of each wall.

Another illustrative embodiment of the present disclosure provides a pipe clamp. This pipe coupling clamps onto an area adjacent ends of first and second abutting pipes. The pipe coupling comprises a first clamp member hinged to a second clamp member. Both first and second clamp members are configured to pivotally wrap around a pipe. Each of the first and second clamp members includes a plurality of ribs extending from an interior surface of each of the first and second clamp members, respectively. A portion of the plurality of ribs of the first clamp member overlaps a portion of the plurality of ribs of the second clamp member. And at least one of the pluralities of ribs extends nonparallel to a second of the plurality of ribs.

Another illustrative embodiment of the present disclosure provides a pipe coupling that includes a first clamp member hinged to a second clamp member. Both the first and second clamp members are configured to pivotally wrap around a pipe and are hinged together by a plurality of fingers. Each of the plurality of fingers includes a wall having first and second opposed surfaces. A hook is attached to the first surface of each wall. Each of the plurality of fingers also includes a pin extending from the second surface of each wall. The fingers are configured so each pin pivotally engages each hook.

Additional features and advantages of the pipe coupling will become apparent to those skilled in the art upon consideration of the following detailed descriptions exemplifying the best mode of carrying out the pipe coupling as presently perceived.

BRIEF DESCRIPTION OF DRAWINGS

The present disclosure will be described hereafter with reference to the attached drawings which are given as non-limiting examples only, in which.

Corresponding reference characters indicate corresponding parts throughout the several views. The exemplification set out herein illustrates embodiments of the pipe coupling, and such exemplification is not to be construed as limiting the scope of the pipe coupling in any manner.

DETAILED DESCRIPTION OF THE DRAWINGS

Figure 1:
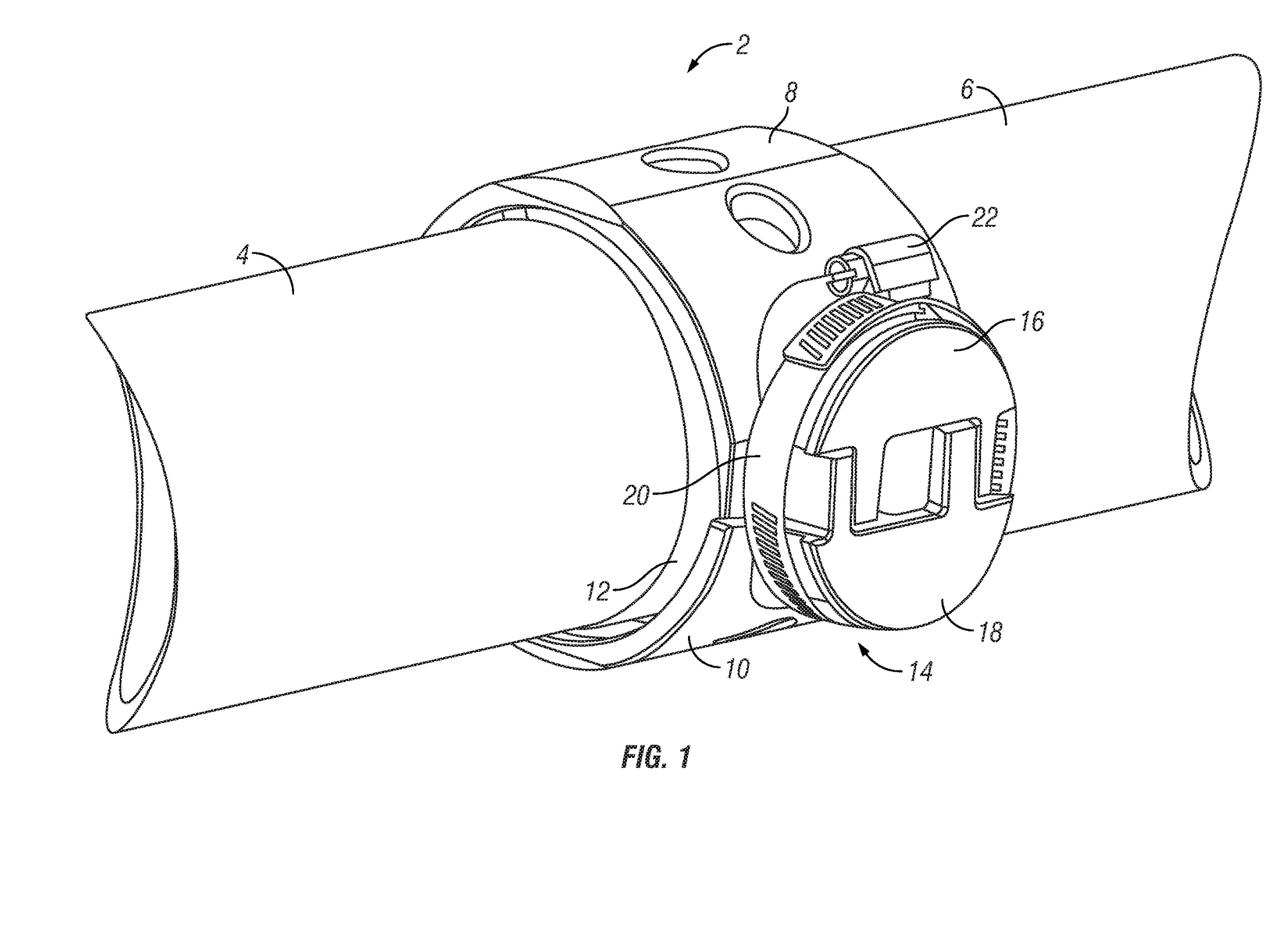
FIG. 1 is a perspective view of an illustrative embodiment of a pipe coupling joining pipe ends together.

A perspective view of pipe coupling 2 joining pipe ends 4 and 6 together is shown in FIG. 1. Pipe coupling 2 includes first clamp half or member 8 and second clamp half or member 10 that wrap around a gasket 12. A curved hub 14 is formed from arched hub portion 16 and 18 clamp halves 8 and 10, respectively. It is appreciated that arcuate hub 14 may be circular, oval, or otherwise curved. An illustrative hose clamp 20 secures around hub 14 as shown tightening at fastener 22 to insure hub portions 16 and 18 secure together.

Figure 2:
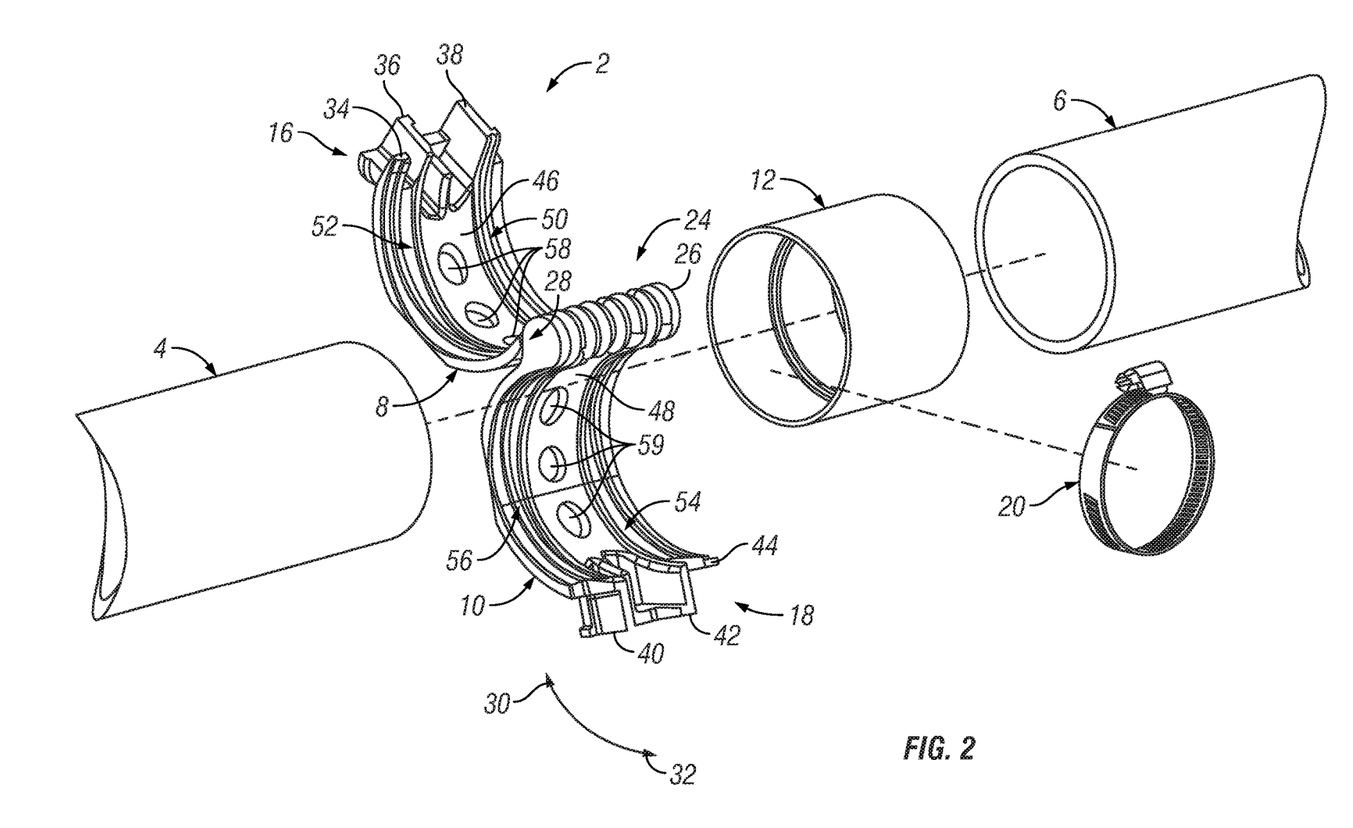
FIG. 2 is an exploded view of the pipe coupling of FIG. 1.

An exploded view of coupling 2, pipe ends 4 and 6, gasket 12 and hose clamp 20 is shown in FIG. 2. This view shows hinge 24 formed from hinge portions 26 and 28 of clamp halves 8 and 10, respectively. It is appreciated that hinge 24 allows clamp halves 8 and 10 to be pivotable in directions 30 and 32 to open and close coupling 2 around gasket 12. This view further shows alignment teeth 34, 36, 38, 40, 42, and 44 that extend from hub portions 16 and 18 of clamp halves 8 and 10, respectively. On inner surfaces 46 and 48 are rib sets 50, 52, 54 and 56, respectively. Each of the rib sets are protrusions from the inner surfaces of the clamp halves. These raised ribs are configured to engage and apply a force against gasket 12 to concentrate the compression force around pipe ends 4 and 6. Illustratively, it is contemplated that the actual ends of pipes 4 and 6 are positionable between ribs 50/52 and 54/56 so each rib set grips one pipe or the other. In the illustrative embodiment, opening 58 and 59 add flexibility of the clamp halves, reduces material and lessens contact at the seam between the two pipe ends. Lessening contact with the pipes' seam allows the clamping force to focus on the pipe walls.

In an illustrative embodiment, it is contemplated that clamp halves 8 and 10 may be identical structures. They are configured in such a way that when each clamp half 8 and 10 face each other, hinge portions 26 and 28 engage to form hinge 24 and alignment teeth 34-44 engage so hub portions 16 and 18 form hub 14.

Figure 3:
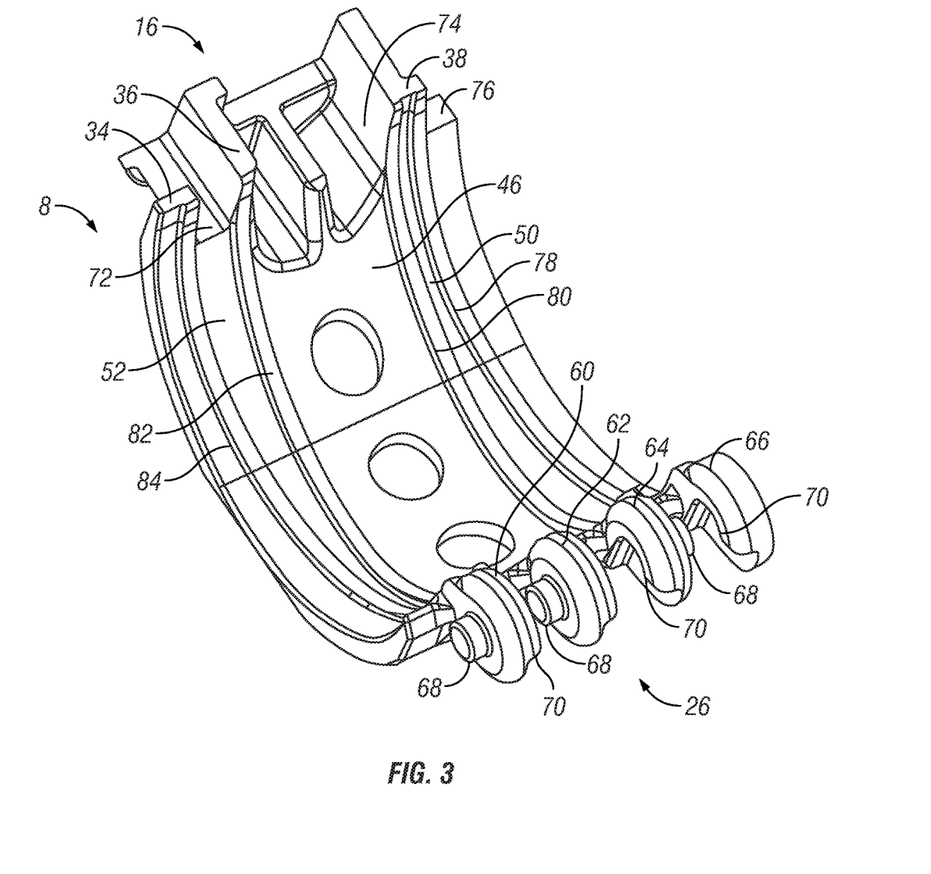
FIG. 3 is a perspective view of a clamp half or clamp member from the pipe clamp of FIG. 1.

A perspective view of clamp half 8 is shown in FIG. 3. It is appreciated that clamp half 8 may be identical to clamp half 10. Accordingly, for purposes of the description of this individual clamp half 8, it is intended that the description applies to clamp half 10 unless indicated otherwise. This view shows the curve of clamp half 8 so it fits around a pipe with hinge portion 26 and hub portion 16 located at opposed ends. This view also shows hinge fingers 60, 62, 64 and 66. Several of these fingers include a pin 68 and hook 70. As discussed further herein, hinge finger 60 and 62 include a pin 68 that extends from a first side and a hook 70 on each opposite side. Conversely, fingers 64 and 66 include a hook 70 on the same side as pins 68 of finger 60 and 62. A pin 68 extends from finger 64 in an opposite direction from pins 68 of fingers 60 and 62. (See also FIGS. 4b and c). Alignment teeth 34, 36, and 38 sit adjacent slots 72, 74, 76 and are configured to receive corresponding alignment teeth from the opposed clamp half. Rib sets 50 and 52 each comprise ribs 78, 80, 82 and 84 extending from surface 46. It is appreciated from this view, albeit a perspective view, that the ribs from rib sets 50 and 52 diverge in different directions. For example, ribs 78 and 80 diverge from alignment tooth 38 as it extends along the surface 46. Conversely, ribs 82 and 84 from teeth 36 and 34, respectively, converge as they extend along surface 46 to finger 60. The ribs diverge and converge so they can overlap at both the hub and hinge ends. Overlapping means the rib sets extend around each clamp half more than 180 degrees so each rib extends adjacent a corresponding rib on the other clamp half. By overlapping the ribs the gasket does not bunch up at the hub and hinge ends.

Figure 4A:
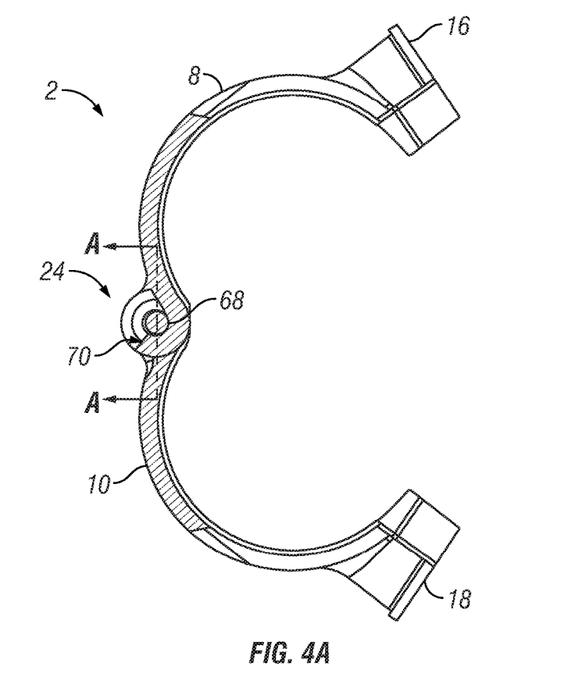
FIGS. 4a-c show various views of a hinge portion of the pipe coupling of FIG. 1.
Figures 4B, 4C:
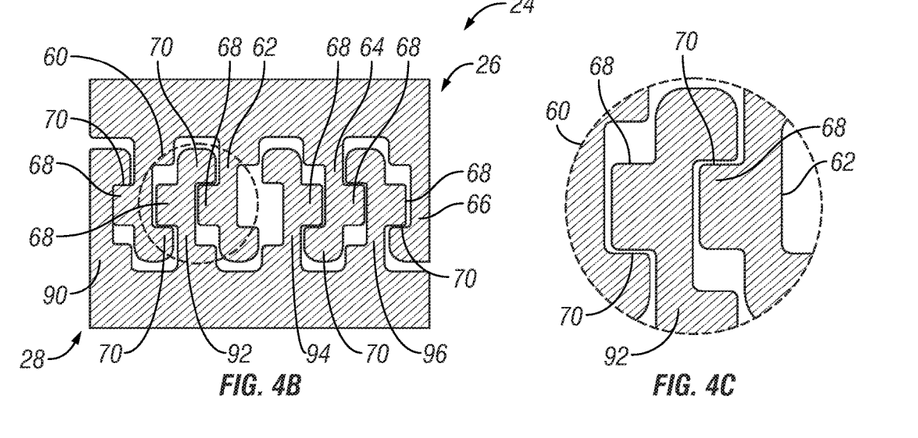

Various views of hinge 24 of pipe coupling 2 are shown in FIGS. 4 a-c. The side view of coupling 2 shown in FIG. 4a demonstrates how first and second clamp halves 8 and 10 pivot about hinge 24 employing the pin 68 and hook 70 arrangement. Due to this, each clamp half 8 and 10 is pivotable in directions 32 and 30 to fit around a pipe. A detailed cross-sectional view of hinge 24 taken along lines A-A of FIG. 4a is shown in FIG. 4b. This view shows each hinge portion 26 and 28 of halves 8 and 10, respectively. Fingers 60, 62, 64, and 66 extend from hinge portion 26 (see also FIG. 3). Conversely, fingers 90, 92, 94 and 96 extend from hinge portion 28. Pins 68 from fingers 60, 62, and 64 engage hooks 70 from fingers 90, 92 and 96. Pins 68 from fingers 92, 94, and 96 engage hooks 70 from fingers 60, 64 and 66. This is because, as previously discussed, both clamp halves 8 and 10 in this illustrative embodiment are identical. Nonetheless, each clamp half having three pins engaging three hooks provide a substantial pivotable connection for the coupling. As shown in the detailed view of FIG. 4c, pins 68 of fingers 92 and 62 engage hooks of fingers 60 and 92, respectively. It is appreciated from this view how opposed forces act on coupling 2 to create a balance of forces in the hinge. The pins are supportable in opposite directions to withstand these forces, not in just one direction. This insures a strong connection to withstand water hammers if they occur inside the pipes.

Figure 5A:
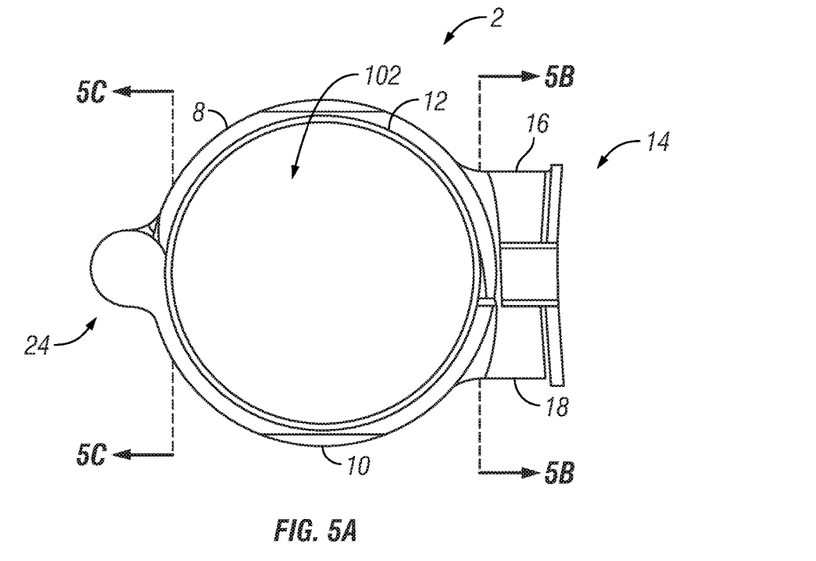
FIGS. 5a-c show several views of the pipe clamp.
Figure 5B:
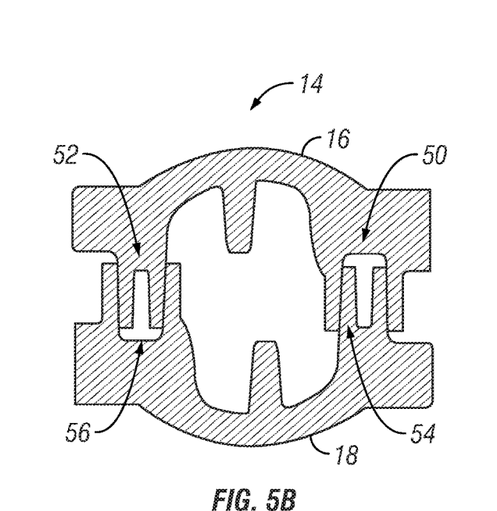
Figure 5C:
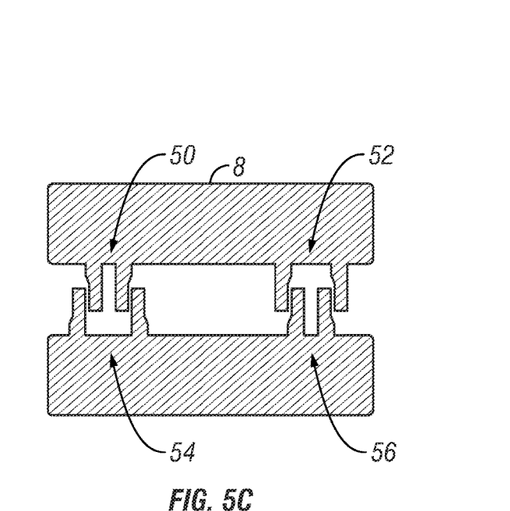
Figure 6A:
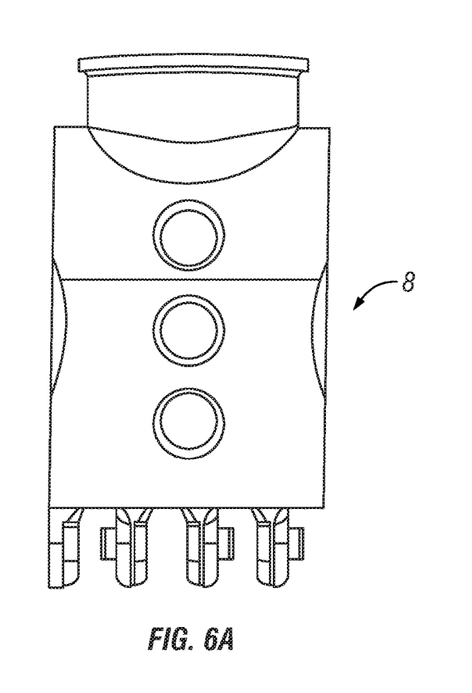
FIGS. 6a-e show various views of a clamp half or clamp member.
Figure 6B:
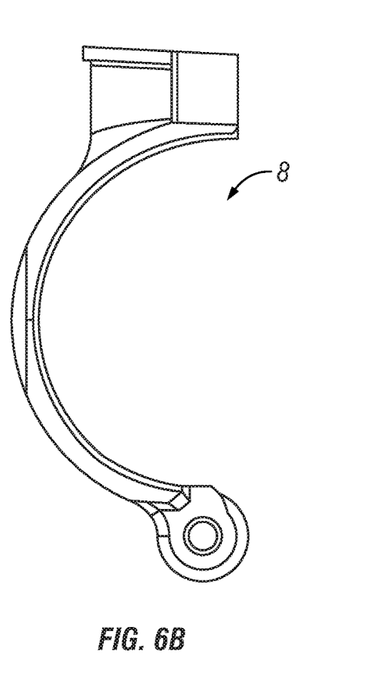
Figure 6C:
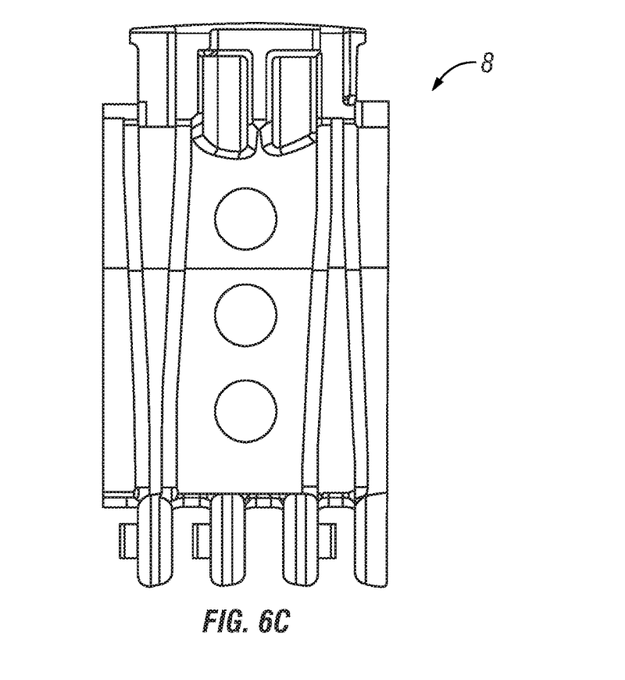
Figure 6D:
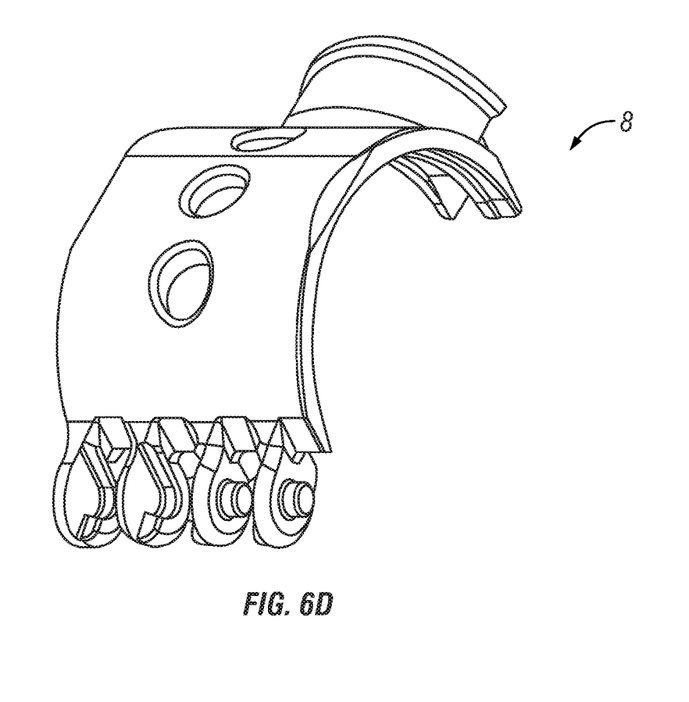
Figure 6E:
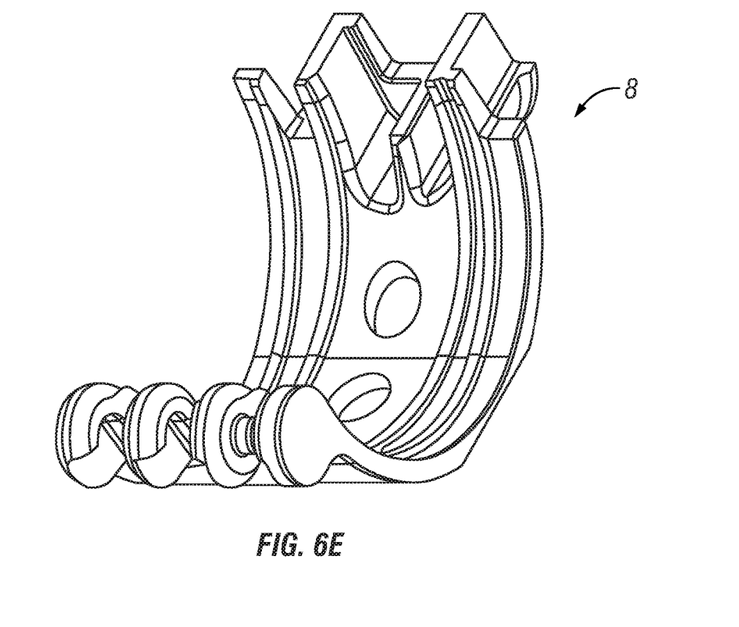

Several views of coupling 2 are shown in FIGS. 5 a-c. A side view of coupling 2 in the clamped position is shown in FIG. 5a. This view demonstrates how when clamp halves 8 and 10 are closed, the clamp encircles gasket 12 and provides an opening 102 configured to receive pipes such as pipe ends 4 and 6, as previously discussed. A cross-sectional, detailed view of hub 14 taken along lines B-B of FIG. 5a is shown in FIG. 5b. This view shows how the rib sets 50 and 54 overlap on hub 14 side. Similarly, rib sets 52 and 56 overlap as shown. This helps with alignment between the clamp halves making installation easier. A view of clamp halves 8 and 10 taken along lines C-C of FIG. 5a at the hinge 24 side is shown in FIG. 5c. This view shows rib sets 50 and 52 engaging rib sets 54 and 56, respectively, to help prevent the gasket from bunching at this portion of coupling 2. It is appreciated from these and other views that strength of the hub is influenced by its arcuate shape. This shape distributes the force around a curve so there is no single stress point to cause a fracture.

FIGS. 6a-e show various views of clamp half 8. It is notable from these views, particularly FIGS. 6d and e, how the same clamp half may simply be rotated to form the second clamp half. This results in more efficient manufacturing and ease of assembly.

Figure 7A:
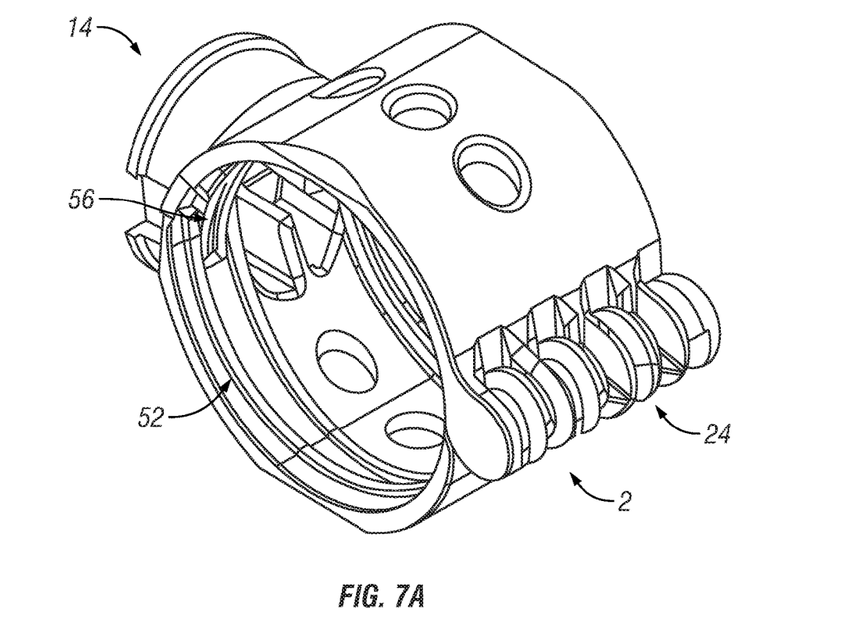
FIGS. 7a-d are several views of the pipe coupling.
Figure 7B:
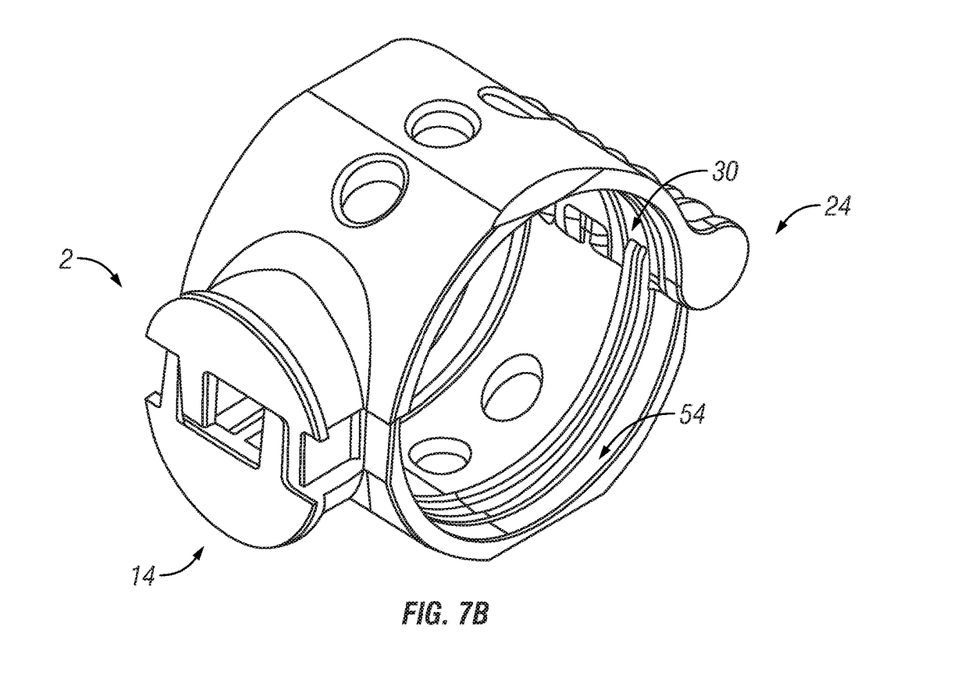
Figure 7C:
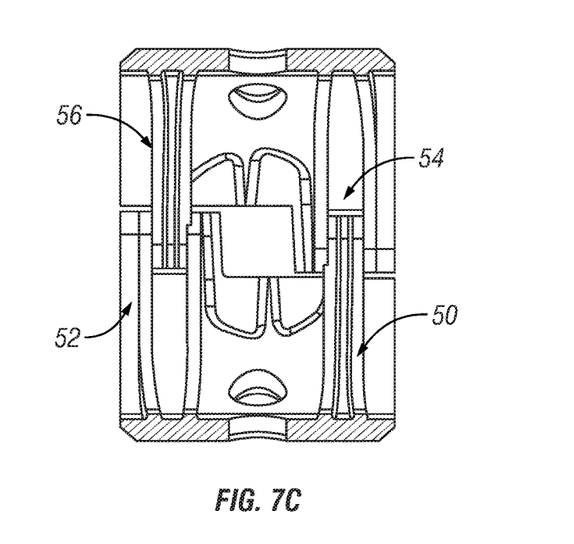
Figure 7D:
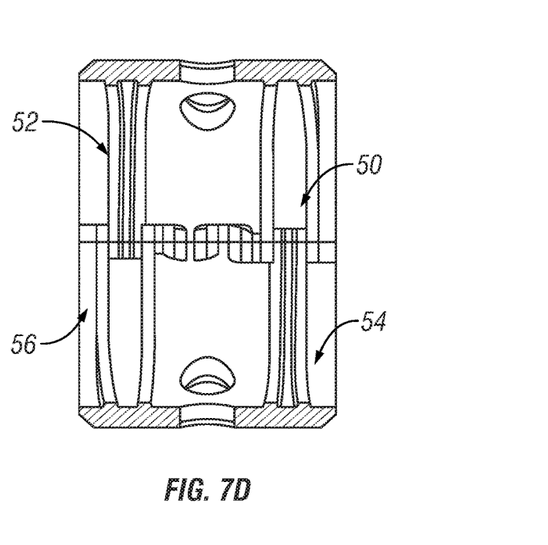

Several views of coupling 2 are shown in FIGS. 7a-d. The perspective views of coupling 2 from FIGS. 7a and b show again how the rib sets overlap. In FIG. 7a, rib set 56 overlaps with set 52 at hub 14. It is appreciated that such overlap occurs at hinge 24 end as well. FIG. 7b likewise shows rib set 50 overlapping set 54. The inside views of coupling 2 in FIGS. 7c and d also show how the rib sets overlap at hub 14 end (FIG. 7c) and the hinge end (FIG. 7d). Again, it is appreciated this overlapping helps prevent the gasket from bunching.

Figure 8:
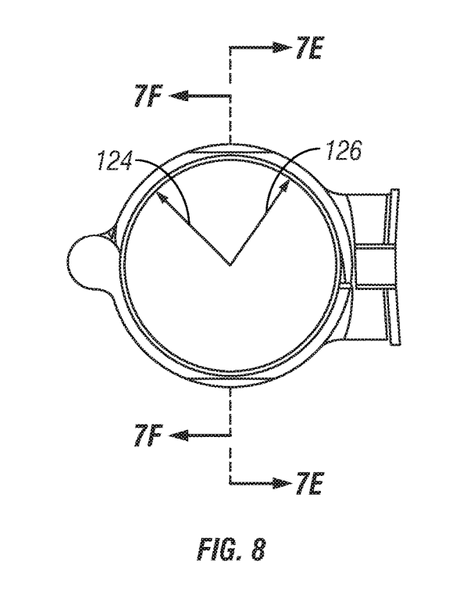
FIG. 8 shows a side view of the pipe coupling demonstrating an illustrative multi radii of each clamp half or member.
Figure 9A:
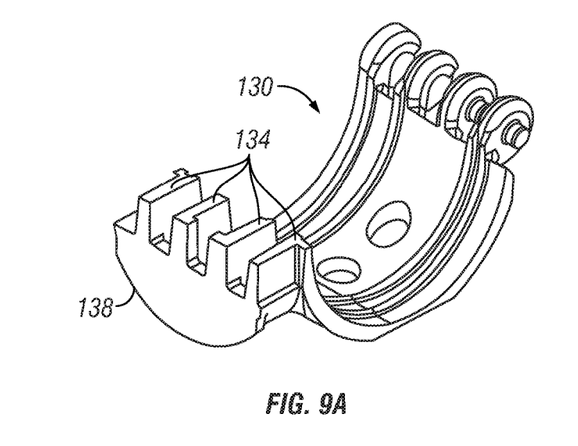
FIGS. 9a-d show several views of a clamp half or member with optional additional teeth extending from its arched hub portion.
Figure 9B:
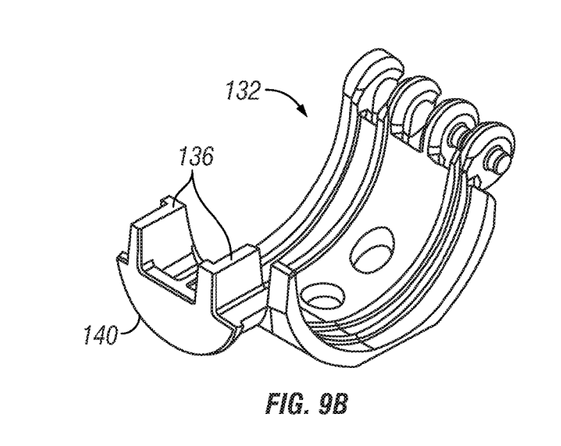
Figure 9C:
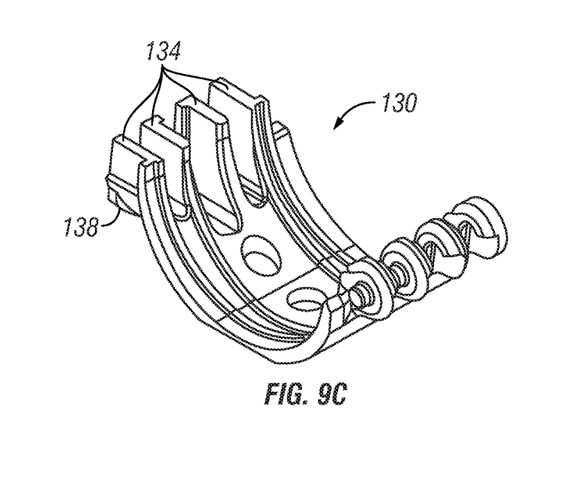
Figure 9D:
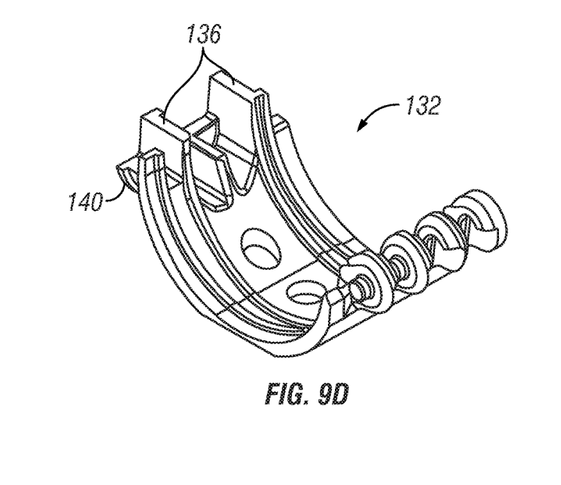

FIG. 8 shows an illustrative embodiment of coupling 2 wherein the radius of each clamp half changes as shown by radius 124 and radius 126. It is appreciated that radius 126 is greater than radius 124. This radius change has been found to allow the coupling to better wrap around the pipe.

FIGS. 9 a-d show several views of clamp halves 130 and 132, respectively with optional additional teeth, 134 and 136, respectively. Teeth 134 and 136 are configured to engage each other to assists in aligning hub portions 138 and 140 together.

Figure 10:
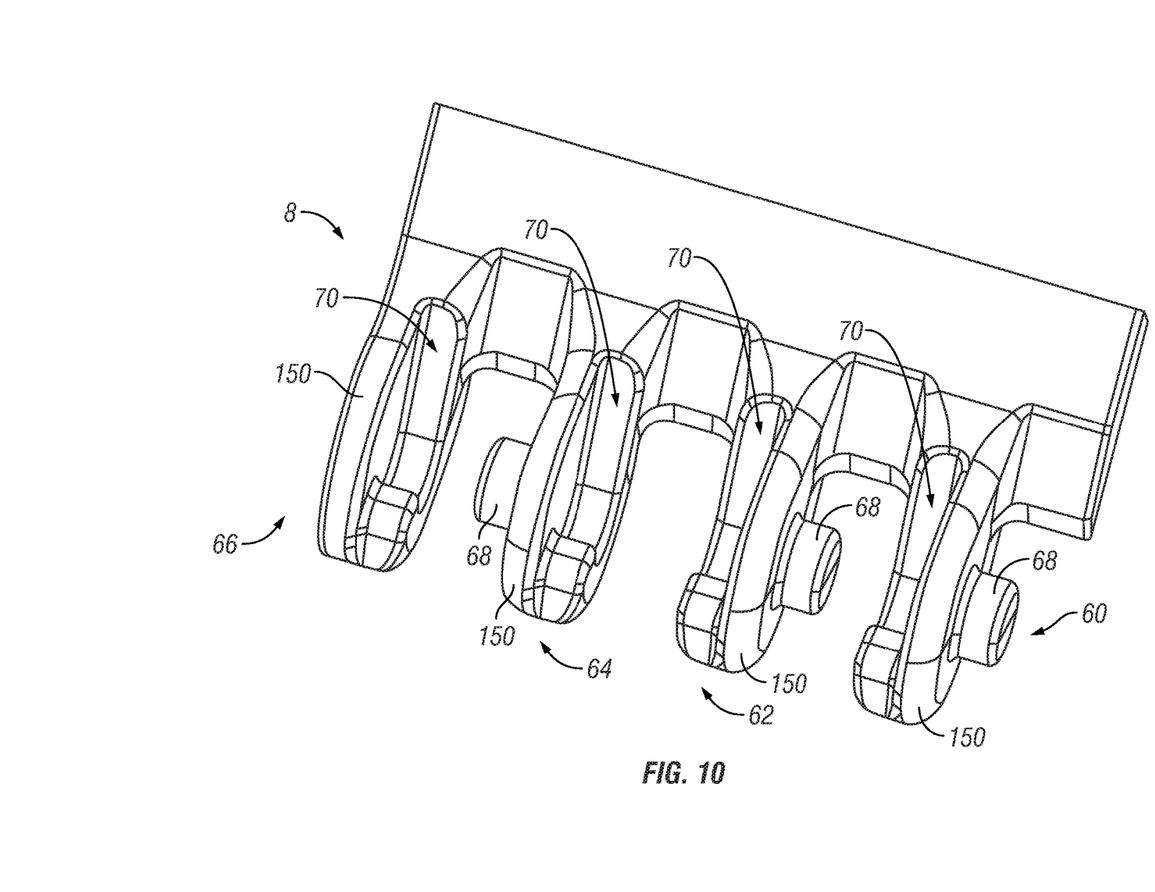
FIG. 10 is a perspective view of the hinge portion of the clamp member.
Figure 11A:
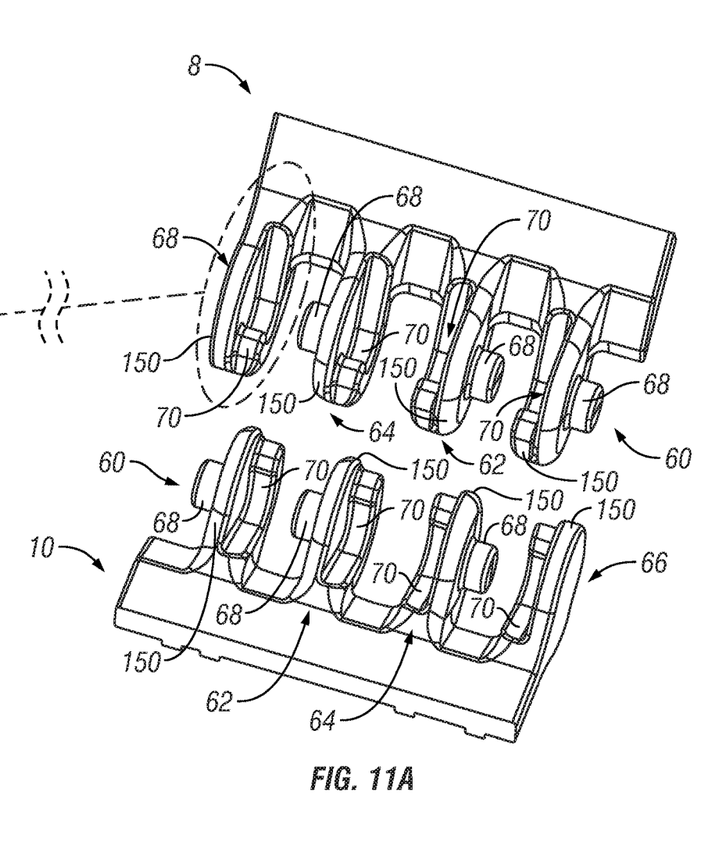
FIGS. 11a and b are perspective views of the hinge portions of two clamp members, as well as a detail view of the hook portion of one of a plurality of hinge fingers.
Figure 11B:
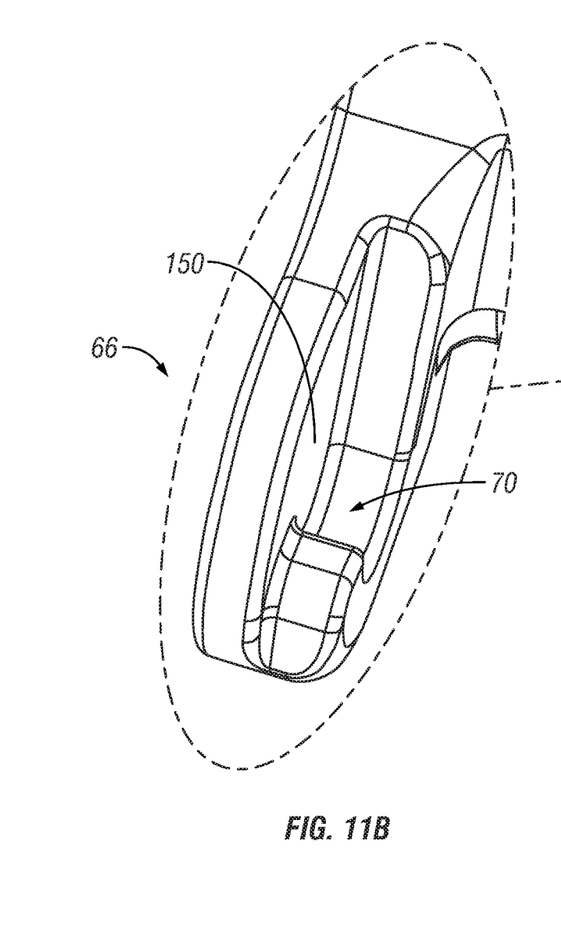

Perspective and perspective detail views of hinge portions 26 including fingers 60, 62, 64, and 66 are shown in FIGS. 10 and 11 a-b. The view in FIG. 10 in particularly, shows how each hook 70 is formed against a wall 150 that makes up each of the fingers 60 through 66. It is appreciated that wall 150 may or may not have the pin 68 extending opposite hook 70. It is further appreciated that wall 150 increases the strength of the fingers. Attaching hook 70 to wall 150 and splitting pin 68 allows the pin-hook configuration to be closer to equal strength to thereby increase the hinge's overall hinge strength.

The view in FIG. 11a shows how hinge 24 is formed via hinge portions 26 of clamp members 8 and 10. With each pin 68 fitting into a corresponding hook 70 and having wall 150 positioned therebetween, a stronger hinge is believed to be formed. The detail view of finger 66 shown in FIG. 11b demonstrates how hook 70 is substantially reinforced when formed with wall 150. With this particular finger 66, there is no pin 68 extending from the other side of wall 150, but it is appreciated that for the other fingers 60 through 64 such pin 68 may extend therefrom.

Corresponding reference characters indicate corresponding parts throughout the several views. Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A pipe coupling that clamps onto an area adjacent ends of first and second abutting pipes, the pipe coupling comprising:
   a first clamp member hinged to a second clamp member;
   wherein both the first and second clamp members form an annular ring configured to pivotally wrap around a pipe;
   wherein each of the first and second clamp members further includes an arched hub surface located exteriorly on the first and second clamp members and configured such that when each of the first and second clamp members engage each other the arched hub surfaces form an exteriorly located annular hub surface; and
   wherein the exteriorly located annular hub surface is oriented about perpendicular to the annular ring formed by the first and second clamp members, and a hose clamp having an annular band that contacts, wraps, and tightens circumferentially around the annular hub surface.

2. The pipe coupling of claim 1, further comprising a gasket configured to fit adjacent the abutting ends of the pipes.

3. The pipe coupling of claim 2, wherein each of the first and second clamp members includes at least one rib extending from an interior surface of each of the first and second clamp members.

4. The pipe coupling of claim 3, wherein the rib is configured to apply a force against the gasket.

5. The pipe coupling of claim 3, wherein the at least one rib on the first and second clamp members are configured to engage the area adjacent ends of first and second abutting pipes.

6. The pipe coupling of claim 1, wherein the first and second clamp members are made of a material selected from a group consisting of flexible plastic, reinforced resin, and metal.

7. The pipe coupling of claim 1, wherein the first and second clamp members are identical to each other.

8. The pipe coupling of claim 1, wherein each of the first and second clamp members includes a plurality of ribs extending from an interior surface of each of the first and second clamp members.

9. The pipe coupling of claim 8, wherein the plurality of ribs extend from an arched hub surface to a hinge portion.

10. The pipe coupling of claim 1, further comprising a plurality of ribs on the first clamp member wherein a first rib of the plurality of ribs is non parallel to a second rib of the plurality of ribs and each of the ribs have the same height.

11. The pipe coupling of claim 10, wherein the plurality of ribs extend from adjacent the arched hub surface to the hinge portion.

12. The pipe coupling of claim 1, further comprising a plurality of ribs on the second clamp member wherein a first rib of the plurality of ribs is non parallel to a second rib of the plurality of ribs and each of the ribs have the same height.

13. The pipe coupling of claim 1, wherein each of the first and second clamp members includes first and second hinge portions configured such that the first hinge portion of the first clamp member is engageable with the second hinge portion of the second clamp member; and wherein the second hinge portion of the first clamp member is engageable with the first hinge portion of the second clamp member.

14. The pipe coupling of claim 13, wherein the first hinge portion includes a first hook on a first side and a first pin extending from a second side opposite the first side and the second hinge portion includes a second hook that is configured to engage the first pin and a second pin that is configured to engage the first hook; to allow the first and second clamp members to pivot with respect to each other; and
   wherein the first pin does not engage the first hook.

15. The pipe coupling of claim 14, wherein the hook and pin are configured to engage each other and movably couple to each other.

16. The pipe coupling of claim 1, wherein each of the first and second arched hub surfaces include at least one tooth extending therefrom.

17. The pipe coupling of claim 1, wherein the first and second clamp members are configured to face each other such that hinge portions on each of the first and second clamp members engage each other to form a hinge; and first and second alignment teeth on each of the first and second clamp members, respectively, are configured to engage each other so the first and second arched hub surfaces form the annular hub surface.

18. The pipe coupling of claim 17, wherein each hinge portion includes a plurality of hinge fingers.

19. The pipe coupling of claim 18, wherein each of the plurality of hinge fingers includes a pin and hook; and wherein the pin extends from a first side of the hinge finger and the hook is located on a second side of the hinge finger opposite the first side.

20. The pipe coupling of claim 18, wherein the pipe coupling does not employ a hinge pin that extends through each of the plurality of hinge fingers.

21. The pipe coupling of claim 18, wherein each of the plurality of hinge fingers on the first clamp member includes a hook, and wherein each of the plurality of hinge fingers on the second clamp member includes a pin.

22. The pipe coupling of claim 18, wherein each of the plurality of hinge fingers includes a wall having first and second surfaces wherein a hook is attached to the first surface of each wall.

23. The pipe coupling of claim 22, wherein each of the plurality of hinge fingers includes a pin extending from the second surface of each wall.

24. The pipe coupling of claim 1, wherein each of the first and second clamp members are curved and configured to collectively fit around a pipe; and wherein each of the first and second clamp members includes a hinge portion being located opposite its arched hub surface.

25. The pipe coupling of claim 1, wherein each of the first and second arched hub surfaces further comprises an alignment tooth; and wherein the alignment tooth of the first arched hub surface is configured to engage the alignment tooth of the second arched hub surface when opposing the first arched hub surface.

26. The pipe coupling of claim 1, wherein the first clamp member includes first and second hinge fingers; wherein each of the first and second hinge fingers includes a pin and hook; and wherein the pin extends from a first side of the first hinge finger and the hook is located on a second side of the finger opposite the first side.

27. The pipe coupling of claim 26, wherein the pin is configured to be received by the hook.

28. The pipe coupling of claim 1, wherein each of the first and second clamp members includes a plurality of longitudinally extending ribs that also extend from an interior surface of each of the first and second clamp members, respectively; and wherein a side portion of the plurality of ribs of the first clamp member overlap a side portion of the plurality of ribs of the second clamp member.

29. The pipe coupling of claim 1, wherein the first clamp member includes a plurality of radii; wherein each radius is different; and wherein the second clamp member includes a plurality of radii wherein each radius is different.

30. The pipe coupling of claim 1, wherein a portion of the first clamp member is configured to overlap a portion of the second clamp member when the first and second clamp members engage each other.

\* \* \* \* \*